United States Patent [19]

Muhr et al.

[11] 4,267,756
[45] May 19, 1981

[54] HOLDDOWN FOR POWER SHEAR

[75] Inventors: Richard Muhr, Attendorn; Werner Schröder, Finnentrop, both of Fed. Rep. of Germany

[73] Assignee: Muhr und Bender, Attendorn, Fed. Rep. of Germany

[21] Appl. No.: 72,628

[22] Filed: Sep. 5, 1979

[30] Foreign Application Priority Data

Sep. 6, 1978 [DE] Fed. Rep. of Germany ....... 2838735

[51] Int. Cl.³ .......................... B23D 33/02; B26D 7/02
[52] U.S. Cl. ........................................ 83/463; 83/464; 83/571; 83/698
[58] Field of Search .............. 83/463, 464, 466, 466.1, 83/451, 639, 571, 698

[56] References Cited

U.S. PATENT DOCUMENTS

| | | | |
|---|---|---|---|
| 274,273 | 3/1883 | Child | 83/463 X |
| 546,607 | 9/1895 | Byrd | 83/464 X |
| 3,091,147 | 5/1963 | Holl et al. | 83/639 X |
| 4,067,252 | 1/1978 | Peddinghaus et al. | 83/571 |

FOREIGN PATENT DOCUMENTS 698199 10/1953 United Kingdom ................. 83/463

*Primary Examiner*—Frank T. Yost
*Attorney, Agent, or Firm*—Karl F. Ross

[57] ABSTRACT

A power shear has a pair of parallel frame plates spaced apart to either side of a fixed blade and a movable blade. The movable blade can be displaced past the fixed blade to shear a workpiece extending across the plane and resting on the fixed blade A holddown plate is slidably mounted in rails on one of the frame plates and has a pair of edges guided by the rails and overreached by teeth formed on these rails. These edges of the holddown plate are formed with notches that can be aligned with the teeth to allow removal of the holddown plate in a direction perpendicular to its plane. A positioning spindle threaded through a nut fixed on the one frame plate can have an enlarged head engaged in a T-shaped cutout of the holddown plate so that when the holddown plate is lifted perpendicularly off the frame plate it is also disengaged from the positioning spindle.

7 Claims, 4 Drawing Figures

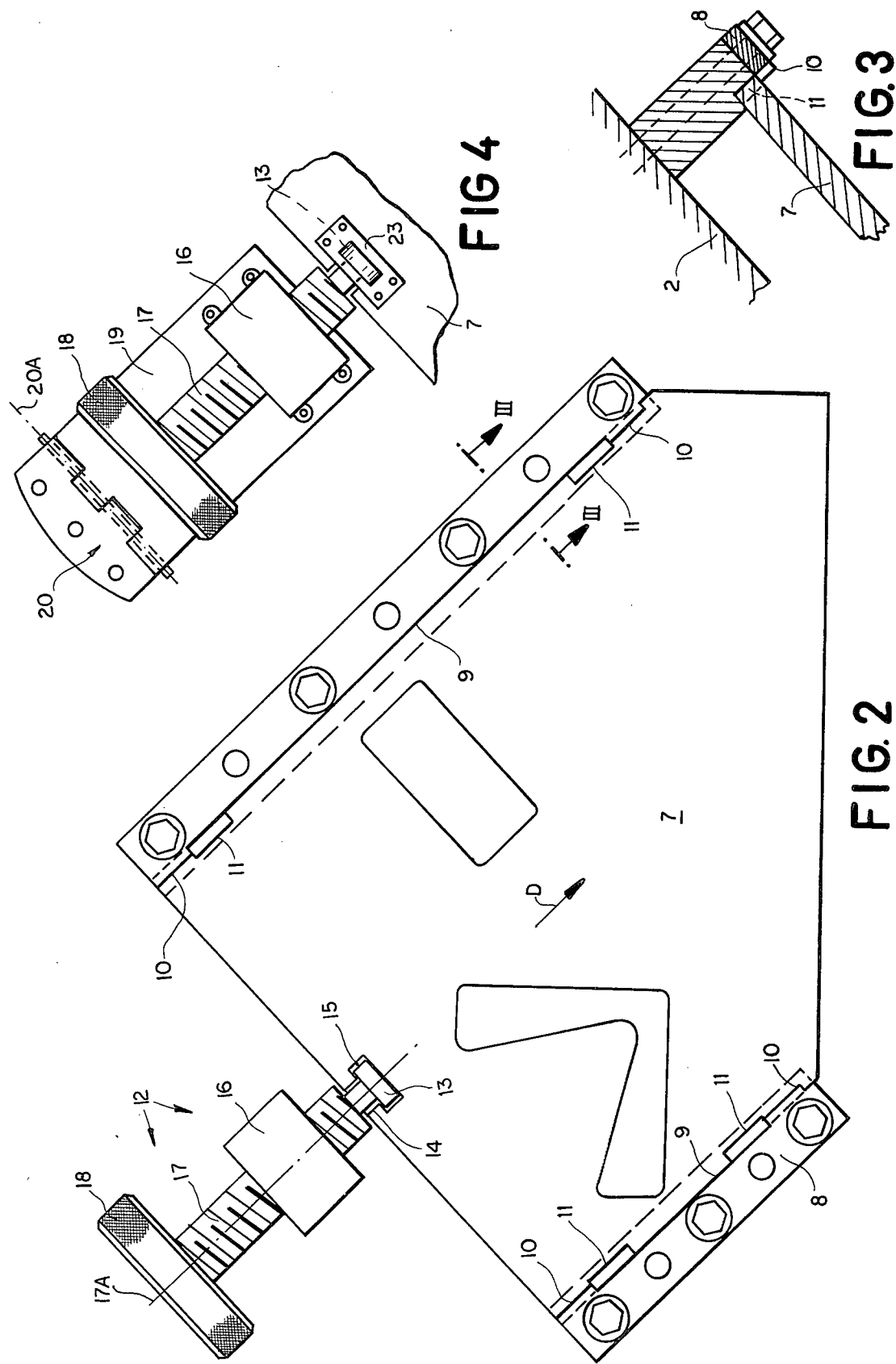

HOLDDOWN FOR POWER SHEAR

FIELD OF THE INVENTION

The present invention relates to a holddown for a power shear. More particularly this invention concerns a heavy-duty shear usable for cutting, notching, or punching steel plate or profile members.

BACKGROUND OF THE INVENTION

A heavy-duty power shear, such as described in our copending and jointly filed application Ser. No. 72,627 has a frame formed by a pair of upright spaced-apart plates between which is provided a pair of blades. One of the blades is fixed on the plates and the other blade is reciprocal in the plane of the plates in the space between them adjacent the fixed blade. One or both of the plates is formed at the blades with a window so that a workpiece to be sheared, punched, stamped, or otherwise acted on by the machine can be inserted through the window and laid on the fixed blade. Displacement of the movable blade past the fixed blade will carry out the desired metalworking operation.

In order to hold the workpiece firmly against the fixed blade during such operation the shear is provided with a holddown, normally in the form of a flat holddown plate slidably mounted on one of the side plates of the machine frame. This plate can move across the window through which the workpiece is inserted and has an edge that can bear normally downwardly on the workpiece. Thus the plate is slid into engagement with the workpiece and is normally retained against movement, frequently by a standard clamping spindle or the like. Rails provided on the one frame plate guide edges of the holddown plate.

It is necessary to periodically change the movable and fixed blades of such a shear. For such an operation it is normally necessary to remove the holddown plate, so as fully to expose the window in the frame plate through which access may be had to the blades. This is normally accomplished by unbolting one of the guide rails and disconnecting whatever mechanism is used to displace and/or lock the holddown plate on the frame plate. Such an operation not only complicates changing the blades of the machine, but also creates the stronger possibility that the machine will be subsequently improperly reassembled.

OBJECTS OF THE INVENTION

It is therefore an object of the present invention to provide an improved shear.

Another object is to provide a shear wherein access can readily be had to the fixed and movable blades by simple removal of the holddown plate.

SUMMARY OF THE INVENTION

These objects are attained according to the instant invention in a power shear of the above-described general type wherein the holddown plate has a pair of plate edges parallel to its displacement direction and each formed with at least one outwardly open notch. The guide rails in turn are formed each with at least one tooth overreaching the plate and alignable with the respective notch in one end position of the holddown plate so as to retain this plate on the frame against movement perpendicular to its displacement direction except in the one position. In this one position the tooth and notch match up so that the plate can easily be removed from the shear by displacing it perpendicularly to its displacement direction and away from the frame plate on which it is carried.

According to this invention the teeth and notches are positioned so that they align only in the extreme end positions of the holddown plate, that is in the extreme down position in which the holddown edge of the plate lies flush with the fixed blade and the extreme up position, as the holddown plate will never normally be moved into either of these positions during normal operation of the machine. A simple bayonet-type mounting according to the invention therefore allows the operator of the machine to remove the holddown plate with ease so that access can readily be had to the blades inside the machine.

According to further features of the invention the machine is provided with means attached between the frame plates of the machine and the holddown plate for displacing the holddown plate relative to the frame and parallel to the plane of these plates. This means includes a nut mounted on the frame and a spindle threaded in the nut and having a spindle end fitted into the holddown plate. Thus rotation of the spindle, which has a spindle axis extending parallel to the plane of the machine, displaces the holddown plate.

According to another feature of this invention the spindle end has an enlarged head and narrow neck, and the holddown plate is formed with a complementarily shaped and throughgoing cutout or notch. Such formation ensures good force transmission in both directions between the spindle and the holddown plate, while permitting the spindle to rotate relative to the holddown plate. At the same time when the holddown plate is lifted off the respective frame plate, after being displaced into an end position so that the notches and teeth align, the holddown plate is simply lifted off the spindle end. Thus no separate operations are necessary for disconnecting the holddown plate from the positioning spindle.

It is also possible according to this invention to mount the nut for the positioning spindle via a hinge on the respective frame plate. In this case the spindle end would be captured in the holddown plate, that is rotatable relative to the holddown plate but not removable from it. This arrangement would therefore allow the holddown plate, once brought into the end position, simply to be pivoted up and out of the way. The advantage of this type of system is that the various parts of the machine would remain connected together even during servicing so that accidental mislaying or damaging of removed parts is impossible.

BRIEF DESCRIPTION OF THE DRAWING

FIG. 2 is a large-scale view of a detail of the machine shown in FIG. 1;

FIG. 3 is a section taken along line III—III of FIG. 2; and

FIG. 4 is a side view of a detail of an alternative arrangement according to this invention.

SPECIFIC DESCRIPTION

Figure 1:
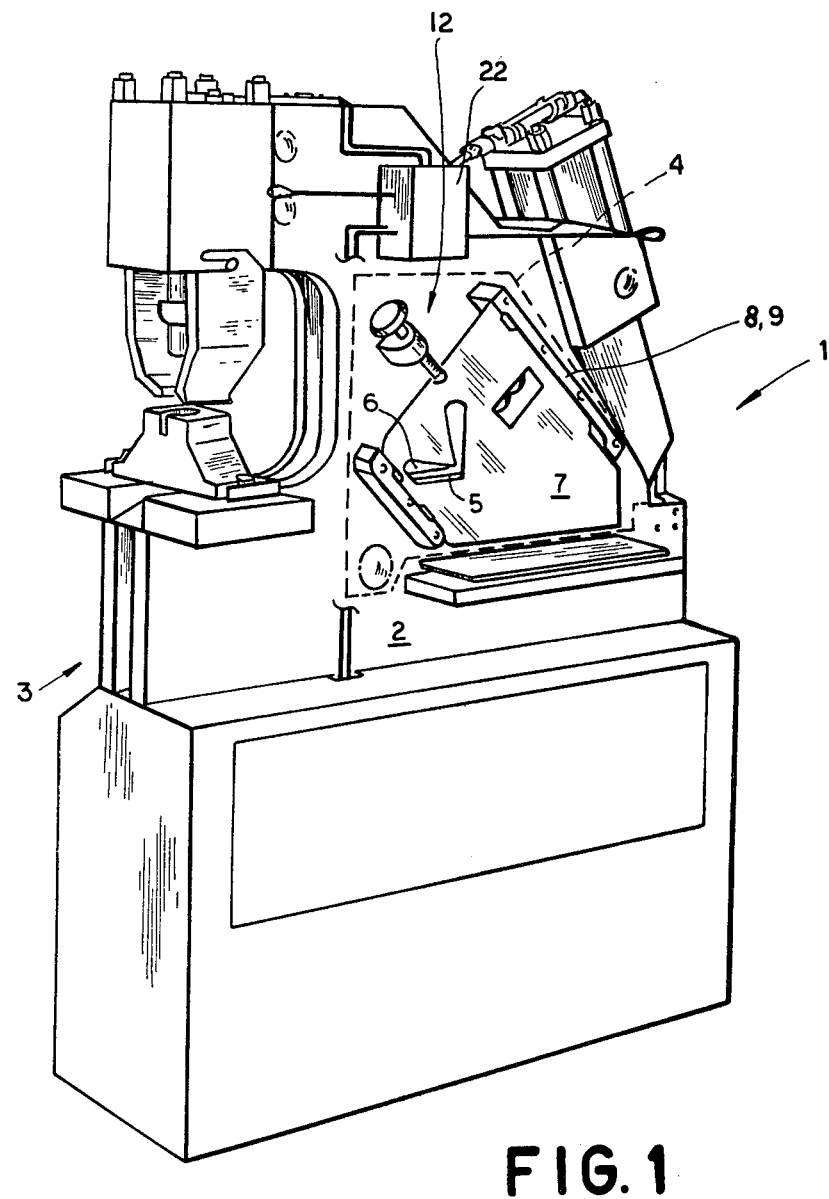
FIG. 1 is a perspective view of the machine according to this invention.

As shown in FIG. 1 a power shear 1 according to this invention has a frame 3 formed by a pair of frame plates 2 separated by a planar gap as described in our above-cited copending and jointly filed application. A work slide 4 is slidable in the gap adjacent a fixed blade 5 and carries a movable blade 6. An actuator 22 can move the slide 4 and blade 6 to shear, cope, or otherwise act on the workpiece between the two blades 5 and 6.

Such a workpiece is held against the blade 5 by means of a holddown plate 7 slidable in a direction parallel to the planes of the plates 2 but inclined at 45° to the horizontal in rails 8 bolted to the one plate 2. The plate 7 has parallel edges 9 that are overreached by rectangular teeth 10 formed at the ends of the rails 8. The edges 9 are formed with rectangular notches 11 which can be aligned with the teeth 10 in end positions of the plate 7. Thus as seen in FIG. 2, if the plate 7 is moved downwardly in its direction D of displacement through a distance equal to the length in this direction D of the teeth 10, the upper portions of the edges 9 will be pulled out from beneath the upper teeth 10 and the lower notches 11 will be aligned with the lower teeth 10 so that the entire plate 7 can be lifted off the respective plate 2. Similar upward movement will align the upper notches 11 with the upper teeth 10 while pulling the lower regions of the edges 9 out from underneath the lower teeth 10 to allow similar disassembly.

The plate 7 is moved in this direction D by a positioner 12 comprising a spindle 17 threaded through a nut 16 bolted to the one plate 2 and having at one end a knurled head 18 and at its other end an enlarged head 13 and a narrow neck 14. The upper transverse edge of the plate 7 is formed with a T-shaped notch 15 complementary to the portions 13 and 14 of the spindle 17. Thus the spindle 17 can be rotated about its axis 17A relative to the plate 7, and will be in force-transmitting engagement with this plate 7 whether it is screwed downwardly or upwardly in the nut 16. Such an arrangement allows extremely easy and accurate positioning of the holddown plate 7. Since the slot 15 is completely throughgoing, it is possible to lift the plate 7 off the head 13 when it is being disassembled as described above. Thus the addition of the positioner 12 in no way makes the removal of the plate 7 more complex.

It is also possible, as shown in FIG. 4, to mount the nut 16 on a plate 19 connected via a hinge 20 to the plate 2. The head 13 is captured between plates 23 on the plate 7 so that the spindle 17 and the plate 7 are joined together. With such an arrangement once the knurled head 18 has been rotated to align one pair of notches 11 with the respective pair of teeth 10, it is merely necessary to pivot up the entire holddown plate 7 about the axis 20A of the hinge 20. This type of operation ensures that no part will be lost during servicing of the machine.

It is therefore possible with the machine according to this invention to remove the holddown plate and gain access to the blades 5 and 6 without having to resort to the use of tools, or to have to disassemble any particular part of the machine. Instead once the plate 7 is moved into one of its end positions it can simply be pulled off the machine. During use of the machine the plate 7 is rarely moved into the end positions, and it is never moved into the end positions when clamping a workpiece. Thus accidental disassembly of the machine is impossible while the machine is being used.

We claim:
1. A power shear comprising:
a frame defining a shear plane;
a fixed blade secured to said frame;
a movable blade displaceable on said frame and along said plane past said fixed blade, whereby a workpiece extending across said plane can be sheared by said blades at said plane;
a holddown plate displaceable in a predetermined direction parallel to said plane on said frame between an up position relatively far from said fixed blade and a down position relatively close to said fixed blade, said holddown plate having a pair of plate edges parallel to said direction and each formed with a plurality of outwardly open notches; and
means including a pair of guide rails on said frame respectively engaging said plate edges, each rail having at least two teeth overreaching said plate and alignable with the respective notches in one of said positions for retaining said plate on said frame against movement perpendicular to said direction except in said one position, one of said teeth of each rail being aligned in a direction perpendicular to said plane in said one end position with one of the respective notches and the other end of said teeth of each rail being aligned in said direction perpendicular to said plane with the other of the respective notches in the other position of said plate, whereby said plate can be separated from said frame in a direction perpendicular to said plane in either of said positions.

2. The shear defined in claim 1, further comprising means attached between said frame and said holddown plate for displacing same relative to said frame parallel to said plane.

3. The shear defined in claim 2 wherein said means includes a nut mounted on said frame and a spindle threaded in said nut and having a spindle end secured to said holddown plate.

4. The shear defined in claim 3 wherein said spindle end has an enlarged head and a narrow neck, said plate being formed with a cutout receiving and complementary to said head and neck.

5. The shear defined in claim 3 wherein said spindle end is captured in said plate and said nut is hinged on said frame.

6. The shear defined in claim 1 wherein said frame is formed by a pair of rigid and parallel frame plates flanking said blades and parallel to said plane.

7. A power shear comprising:
a frame defining a shear plane;
a fixed blade secured to said frame;
a movable blade displaceable on said frame and along said plane past said fixed blade, whereby a workpiece extending across said plane can be sheared by said blades at said plane;
a holddown plate displaceable in a predetermined direction parallel to said plane on said frame between an up position relatively far from said fixed blade and a down position relatively close to said fixed blade, said holddown plate having a pair of plate edges parallel to said direction and each formed with at least one outwardly open notch;
means including a pair of guide rails on said frame respectively engaging said plate edges, each rail having at least one tooth overreaching said plate and alignable with the respective notch in one of said positions for retaining said plate on said frame against movement perpendicular to said direction except in said one position; and
means attached between said frame and said holddown plate for displacing same relative to said frame and parallel to said plane and including a nut hinged on said frame and a spindle threaded in said nut and having a spindle end captured in and secured to said holddown plate.

* * * * *